(12) United States Patent
Kuo

(10) Patent No.: US 6,789,668 B2
(45) Date of Patent: Sep. 14, 2004

(54) COMPACT DISC CONTAINER

(76) Inventor: Hsin-Wen Kuo, 18F-1, No. 131, Shinjuang 1st Rd., Kaohsiung (TW)

( * ) Notice: Subject to any disclaimer, the term of this patent is extended or adjusted under 35 U.S.C. 154(b) by 162 days.

(21) Appl. No.: 10/287,523

(22) Filed: Nov. 5, 2002

(65) Prior Publication Data

US 2004/0084335 A1 May 6, 2004

(51) Int. Cl.[7] .......................... B65D 85/57; A47G 29/00
(52) U.S. Cl. .................... 206/310; 206/303; 206/308.1; 211/40; 211/194; 211/41.12
(58) Field of Search .............................. 206/307, 307.1, 206/308.1, 310, 303, 445; 211/40, 41.1, 41.12, 43, 175, 194

(56) References Cited

U.S. PATENT DOCUMENTS

| | | | | |
|---|---|---|---|---|
| 2,922,527 A | * | 1/1960 | Ann Finn ...................... 211/40 |
| 3,266,688 A | * | 8/1966 | Sefton ......................... 294/158 |
| 4,254,879 A | * | 3/1981 | Maule ........................... 211/4 |
| 4,377,233 A | * | 3/1983 | Pahler ......................... 206/310 |
| 5,669,494 A | * | 9/1997 | Geffen ....................... 358/1.15 |
| 6,112,894 A | * | 9/2000 | Kikuchi et al. .......... 206/308.1 |
| 6,119,872 A | * | 9/2000 | Flores et al. .................. 211/40 |
| 6,296,114 B1 | * | 10/2001 | Bubb et al. ............. 206/308.1 |
| 6,712,223 B2 | * | 3/2004 | Kuo ............................ 211/40 |
| 2001/0050239 A1 | * | 12/2001 | Ishii ........................ 206/308.1 |

FOREIGN PATENT DOCUMENTS

JP          61009880 A  *  1/1986  .......... G11B/23/03

* cited by examiner

Primary Examiner—Jila M. Mohandesi

(57) ABSTRACT

A compact disk container includes a base having a central bar to support serially stacked compact disks, a cover being diametrically smaller than the base and having a downward extended central sleeve, first connecting means including angularly connected horizontal and vertical bars, and second connecting means including angularly connected horizontal and vertical tubes. By connecting the horizontal bar and tube together, the vertical tube to the central bar of the base, and the vertical bar to the central sleeve of the cover laid in a reversed position, compact disks stacked on the base may be shifted along the connected first and second connecting means to the reversed cover, enabling a user to conveniently locate a desired compact disk and remove the same from the container by separating the connected horizontal tube and bar, or the connected vertical tube and central bar from each other.

5 Claims, 7 Drawing Sheets

COMPACT DISC CONTAINER

BACKGROUND OF THE INVENTION

The present invention relates to a compact disc (CD) container, and more particularly to a CD container allowing quick access to a desired CD stored therein and convenient removal of the same from the CD container.

Computers have been widely employed to handle various kinds of works from word processing to multimedia functions due to their increasingly enhanced ability in processing digital data. In keeping a large amount of backup files, compact discs have gradually replaced the conventional magnetic disks as a storing medium. A type of currently most popular compact disc, namely, CD-R, has a storage capacity as high as 850 MB. Nevertheless, computer users often require several decades of compact disks to store and/or backup data. Moreover, compact disks for storing multimedia data, such as video CD and game CD, are usually sold in one full set of several pieces. Consumers have to prepare a convenient CD container or CD rack for well keeping these compact disks as a whole.

FIGS. 1 and 2 are exploded and assembled perspective views, respectively, of a conventional CD container 1 in the shape of a hollow cylinder, and includes a base 11 and a cylindrical cover 12. The base 11 includes an upright bar 111 vertically projected from a top center of the base 11 for supporting a plurality of compact disks 2 stacked on the base 11 and preventing the compact disks 2 from undesired radial movement relative to the CD container 1. The cylindrical cover 12 is closed onto the base 11 to protect the compact disks 2 supported on the bar 111 against dust. While the above-described CD container 1 has simple structure to save a lot of room that is otherwise occupied by extra and unnecessary packages, it has the following disadvantages:

1. It can be positioned in only one single manner. Since the compact disks 2 are stacked on the base 11 in the CD container 1 by serially putting them around the upright bar 111, the upright bar 111 is the only member for supporting the compact disks 2 and preventing the same from displacement in the CD container 1. This structure does not permit the CD container 1 to be horizontally positioned, because the bar 111 having only one end fixed to the base 11 and in a horizontal position is not strong enough to bear a total weight of the compact disks 2 supported thereon.

2. It is uneasy to remove a target compact disk 2 from the CD container 1. When it is desired to get a target compact disk 2 located at lower or middle portion of the serially stacked compact disks 2, a user must first remove all the compact disks 2 above the target disk 2 from the bar 111 and then replaces the removed compact disks 2 one by one after the target disk 2 has been moved out of the container 1. It takes quite a long time for a user to get a target disk 2 that is located close to the bottom of the CD container 1 and to replace all the compact disks 2 previously removed from the upright bar 111. Moreover, it is uneasy to conveniently search for a desired compact disk 2 when all the compact disks 2 are vertically serially stacked on the base 11.

It is therefore tried by the inventor to develop an improved CD container to overcome the disadvantages existed in the conventional CD container 1 and enable convenient search and quick removal of a target compact disk from the CD container.

SUMMARY OF THE INVENTION

A primary object of the present invention is to provide a CD container that enables convenient search and quick removal of a target compact disk from the CD container. To achieve the above and other objects, the CD container of the present invention mainly includes a base having a central bar to support a plurality of compact disks serially stacked on the base, a cylindrical cover having a diameter slightly smaller than that of the base and a central sleeve downward extended from a closed top of the cover, first connecting means including a horizontal bar and a vertical bar connected to each other at one end thereof, and second connecting means including a horizontal tube and a vertical tube connected to each other at one end thereof. By connecting the vertical tube of the second connecting means to the central bar of the base, the horizontal tube to the horizontal bar, and the vertical bar of the first connecting means to the central sleeve of the cylindrical cover laid in a reversed position, compact disks stacked on the base may be shifted along the connected second and first connecting means to the reversed cylindrical cover, and a desired compact disk may be quickly located and removed from the container by disengaging the first from the second connecting means or the vertical tube of the second connecting means from the central bar of the base.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
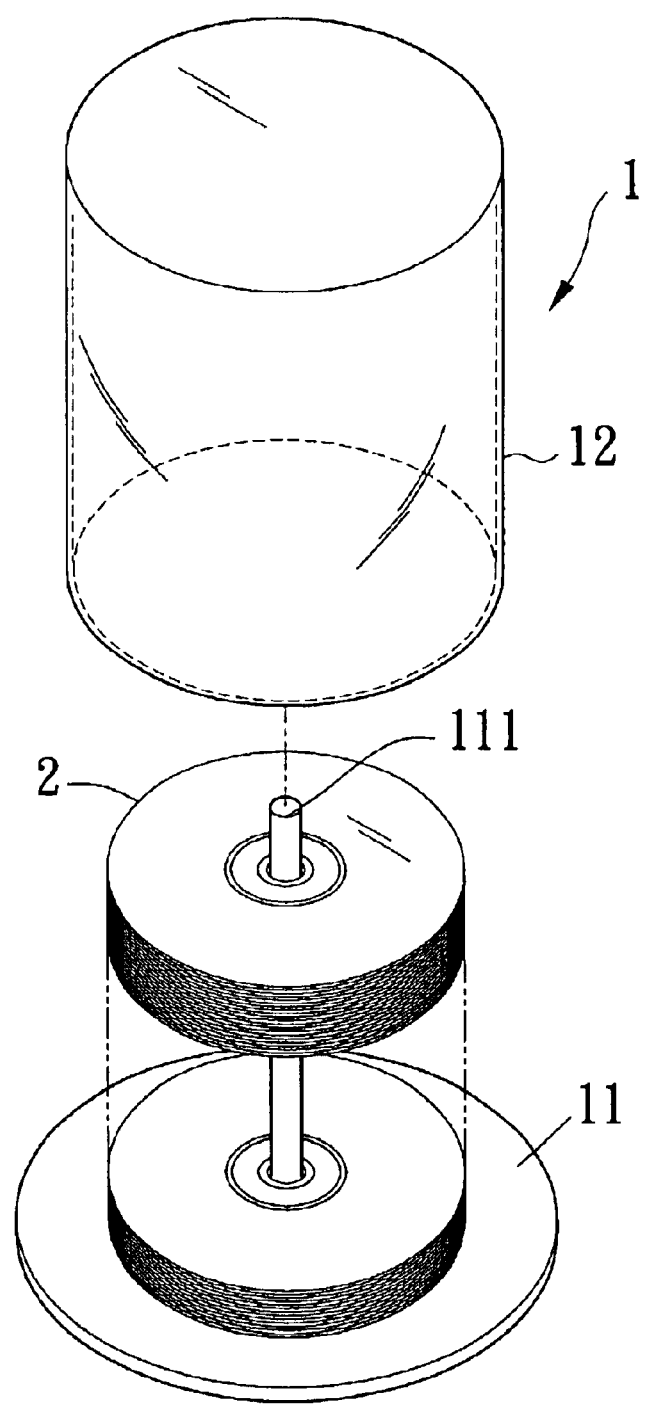
FIG. 1 is an exploded perspective view of a conventional CD container.
Figure 2:
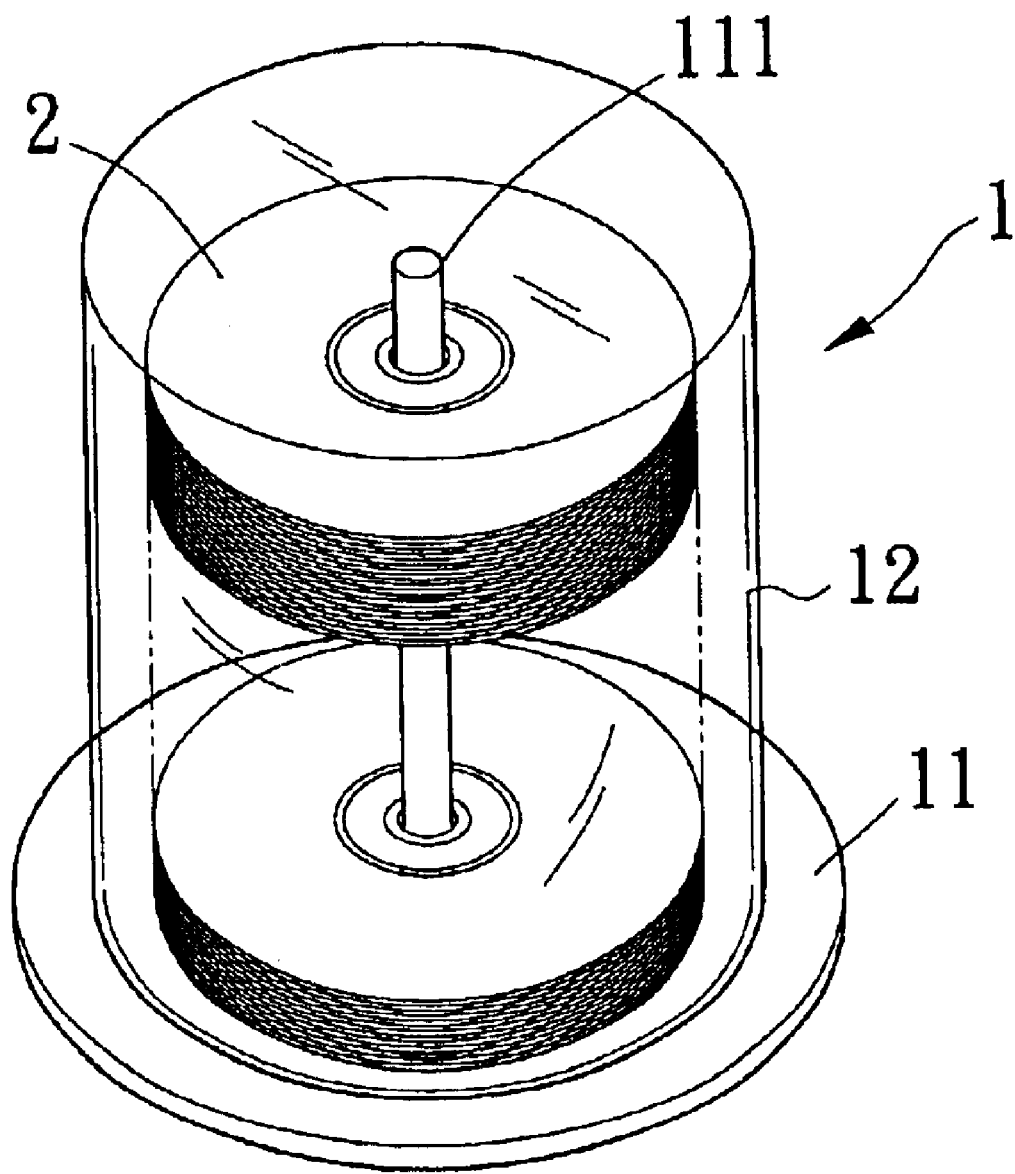
FIG. 2 an assembled perspective view of FIG. 1 showing the use of the conventional CD container.
Figure 3:
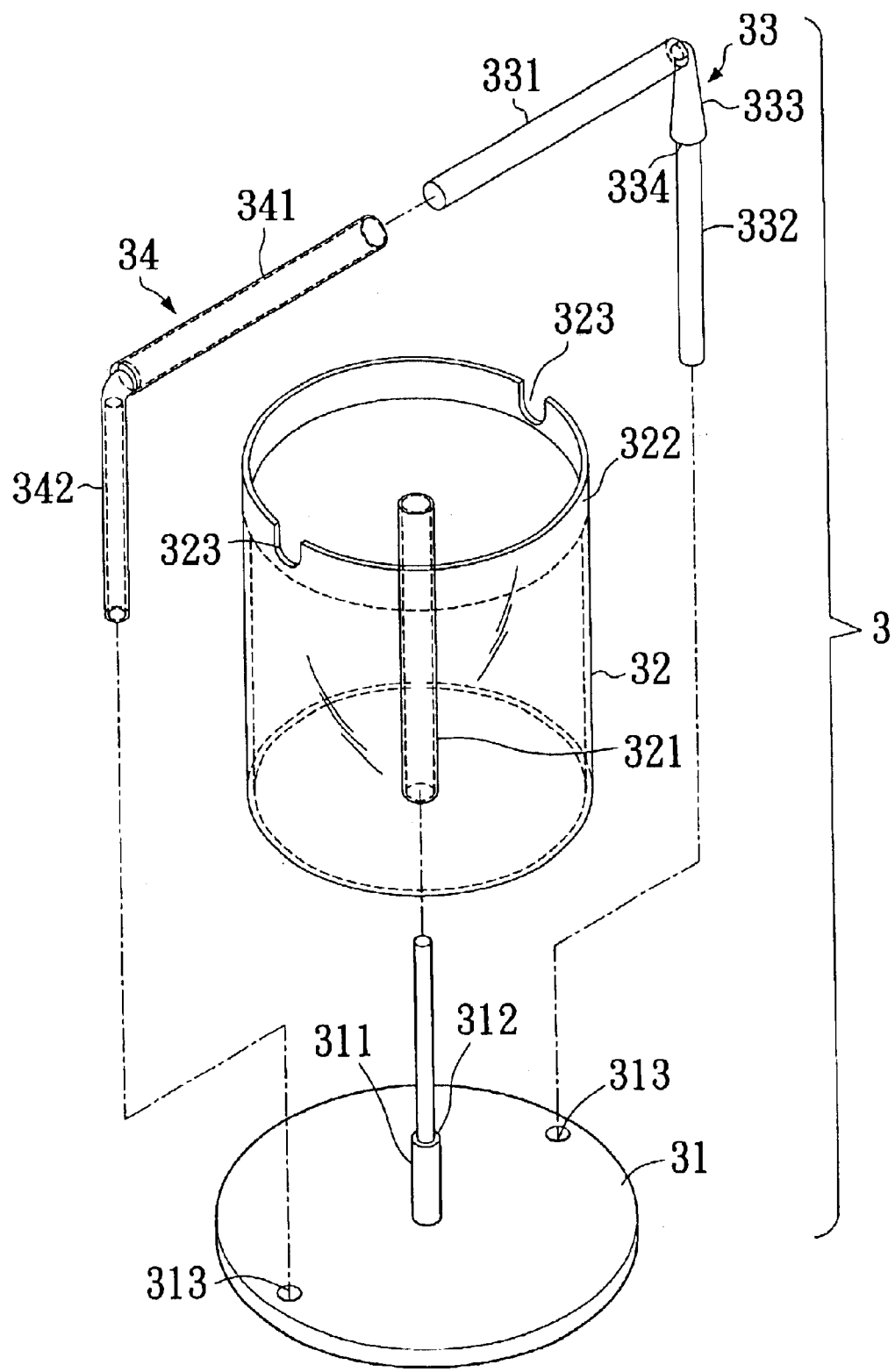
FIG. 3 is an exploded perspective view of a CD container according to the present invention.
Figure 4:
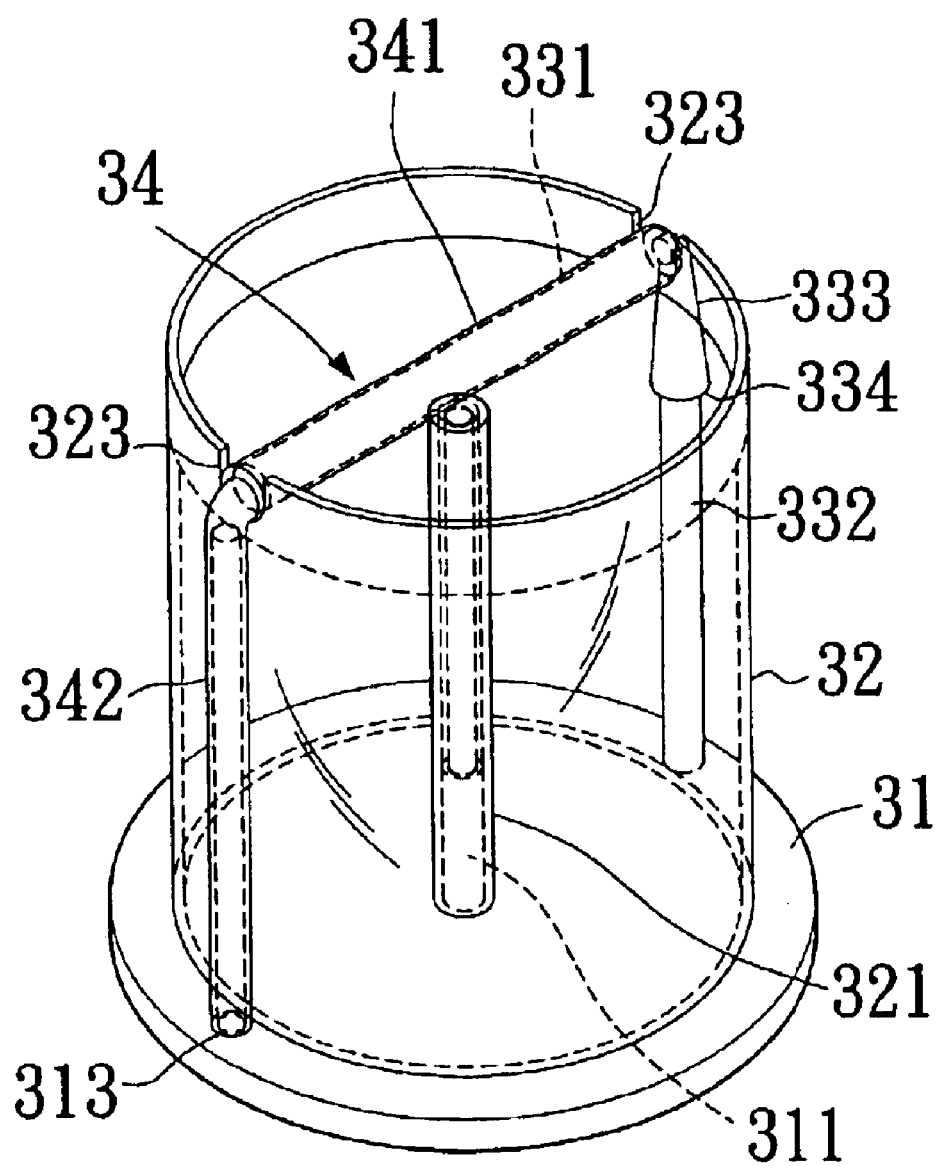
FIG. 4 is assembled perspective view of FIG. 3.

Please refer to FIGS. 3 and 4 that are exploded and assembled perspective views, respectively, of a compact disk (CD) container 3 of the present invention. As shown, the CD container 3 includes a base 31, a cylindrical cover 32, first connecting means 33, and second connecting means 34.

The base 31 includes a stepped central bar 311 vertically projected from a top center thereof. The stepped central bar 311 has a first shoulder portion 312 located at a predetermined height from the top of the base 31. Two insertion holes 313 are formed at two diametrically opposite sides of the base 31.

The cylindrical cover 32 has a diameter slightly smaller than that of the base 31 for correspondingly closing onto the top of the base 31. A central sleeve 321 is vertically extended from a center of a closed top of the cylindrical cover 32 down into the cover 32 to receive the stepped central bar 311 therein when the cover 32 is closed onto the base 31. An axial flange 322 is vertically upward extended from an outer peripheral edge of the closed top of the cover 32, and two notches 323 are symmetrically provided at two diametrically opposite points of the flange 322.

The first connecting means 33 include a horizontal bar 331 and a vertical bar 332 connected to each other at one end thereof. The vertical bar 332 is a stepped bar, and an end 333 of which connected to the horizontal bar 331 is formed into a conic head with a second shoulder portion 334 formed between a rear end of the conic head 333 and the vertical bar 332. The vertical bar 332 is adapted to insert into the central sleeve 321 of the cylindrical cover 32 when the latter is turned upside down, with the second shoulder portion 334 abutted on a free end of the central sleeve 321. The conic head 333 axially extends by a distance equal to the height of the first shoulder portion 312 of the stepped central bar 311 on the base 11.

The second connecting means 34 include a horizontal tube 341 and a vertical tube 342 connected to each other at one end thereof. The end of the vertical tube 342 connected to the horizontal tube 341 has a diameter slightly smaller than that of the horizontal tube 341. The vertical tube 342 is adapted to receive the central bar 311 on the base 11 with a lower end of the vertical tube 342 abutted on the first shoulder portion 312 of the central bar 311. The horizontal tube 341 is adapted to movably receive the horizontal bar 331 of the first connecting means 33 via an end opposite to the vertical tube 342.

To assemble the CD container 3, first position the cylindrical cover 32 on the top of the base 31, connect the horizontal bar 331 and the horizontal tube 341 of the first and the second connecting means 33, 34, respectively, to each other, and let the first and the second connecting means 33, 34 straddle the top of the cylindrical cover 32 with two outer ends of the connected horizontal bar and tube 331, 341 seated in the two notches 323 on the flange 322. Thereafter, insert the vertical bar 332 and the vertical tube 342 of the first and the second connecting means 33, 34, respectively, into the two insertion holes 313 on the base 31 to fix the first and the second connecting means 33, 34 to CD container 3, as shown in FIG. 4.

To take out a target compact disk 2 from the serially stacked compact disks 2 in the CD container 3, first remove the first and the second connecting means 33, 34 from the CD container 3, open and reverse the cylindrical cover 32, put the vertical tube 342 of the second connecting means 34 on the central bar 311 of the base 11, connect the horizontal tube 341 to the horizontal bar 331 and allow the two members to overlap each other by a length depending on actual need, and then insert the vertical bar 332 of the first connecting means 33 into the central sleeve 321 of the reversed cylindrical cover 32. The horizontal bar 331 and the horizontal tube 341 are now located at a position about a radius of the compact disk 2 higher than a highest point of the cylindrical cover 32, allowing the compact disks 2 stacked on the base 31 to move along the connected first and second connecting means 33, 34 to the reversed cylindrical cover 32.

When it is desired to take out some target compact disks 2 from the base 31, a user may shift the unwanted compact disks 2 to the reversed cylindrical cover 32 about ten pieces at a time. For an optimum working effect, an overall height of the compact disks 2 being shifted at a time should not exceed an overall length of the horizontal tube 341. That is, when the user tries to locate a target compact disk 2 from the serially stacked compact disks 2 on the base 31, he or she may move the non-target compact disks 2 to the horizontal bar 331 for them to pass the conic head 333 of the vertical bar 332 and fall to the closed top of the reversed cylindrical cover. By giving the central sleeve 321 a designed diameter slightly smaller than a central hole of the compact disk 2, the compact disks 2 are allowed to smoothly and stably fall in a horizontal position under guiding of the central sleeve 321.

Air inside the reversed cylindrical cover 32 generates a resistance to the falling compact disks 2, enabling the compact disks 2 to fall at a slowed speed and avoid any possible scrap due to collision of the falling compact disks 2 with the cylindrical cover 32.

Figure 5:
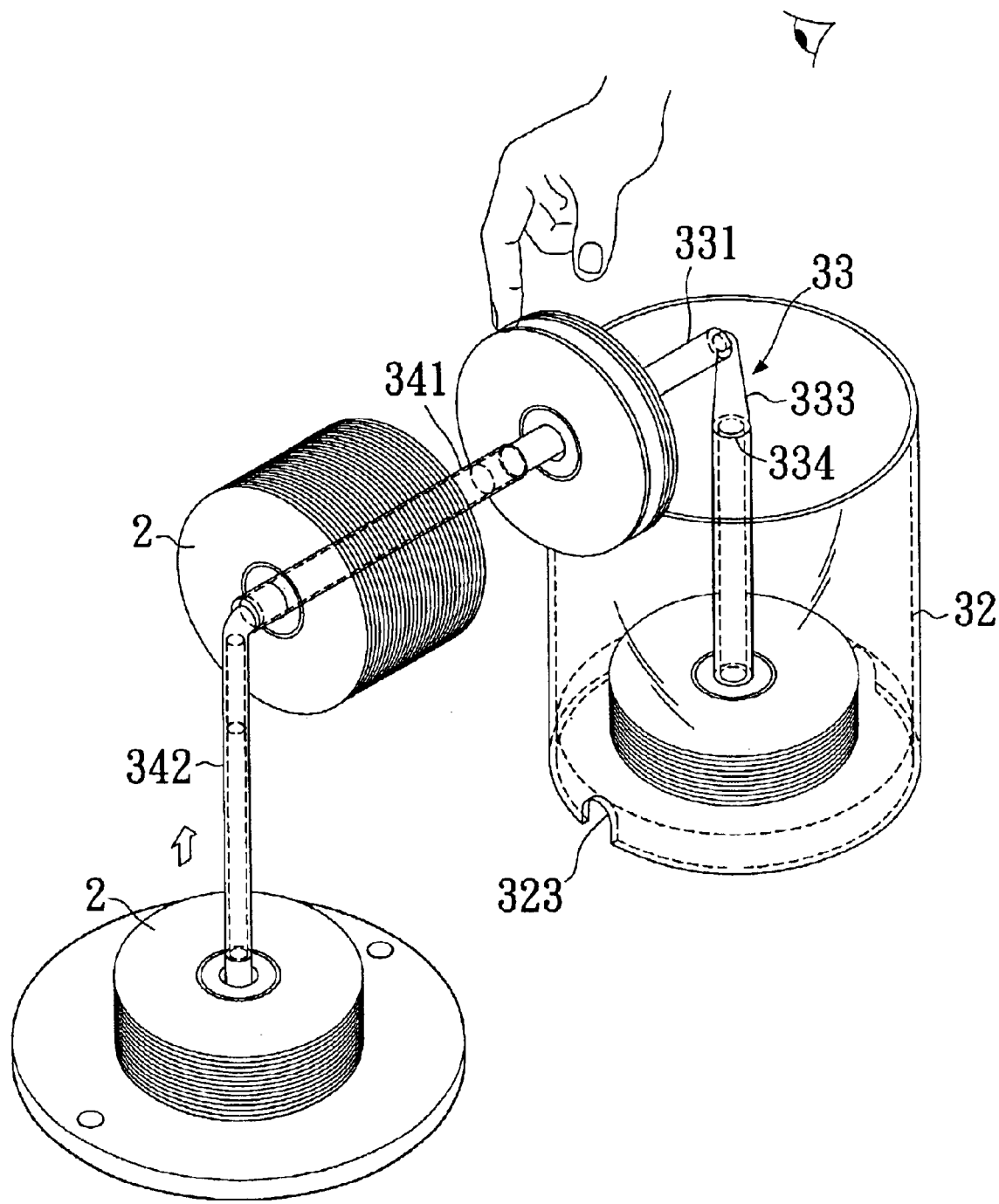
FIGS. 5, 6, and 7 together shows the manner of using the CD container of the present invention.
Figure 6:
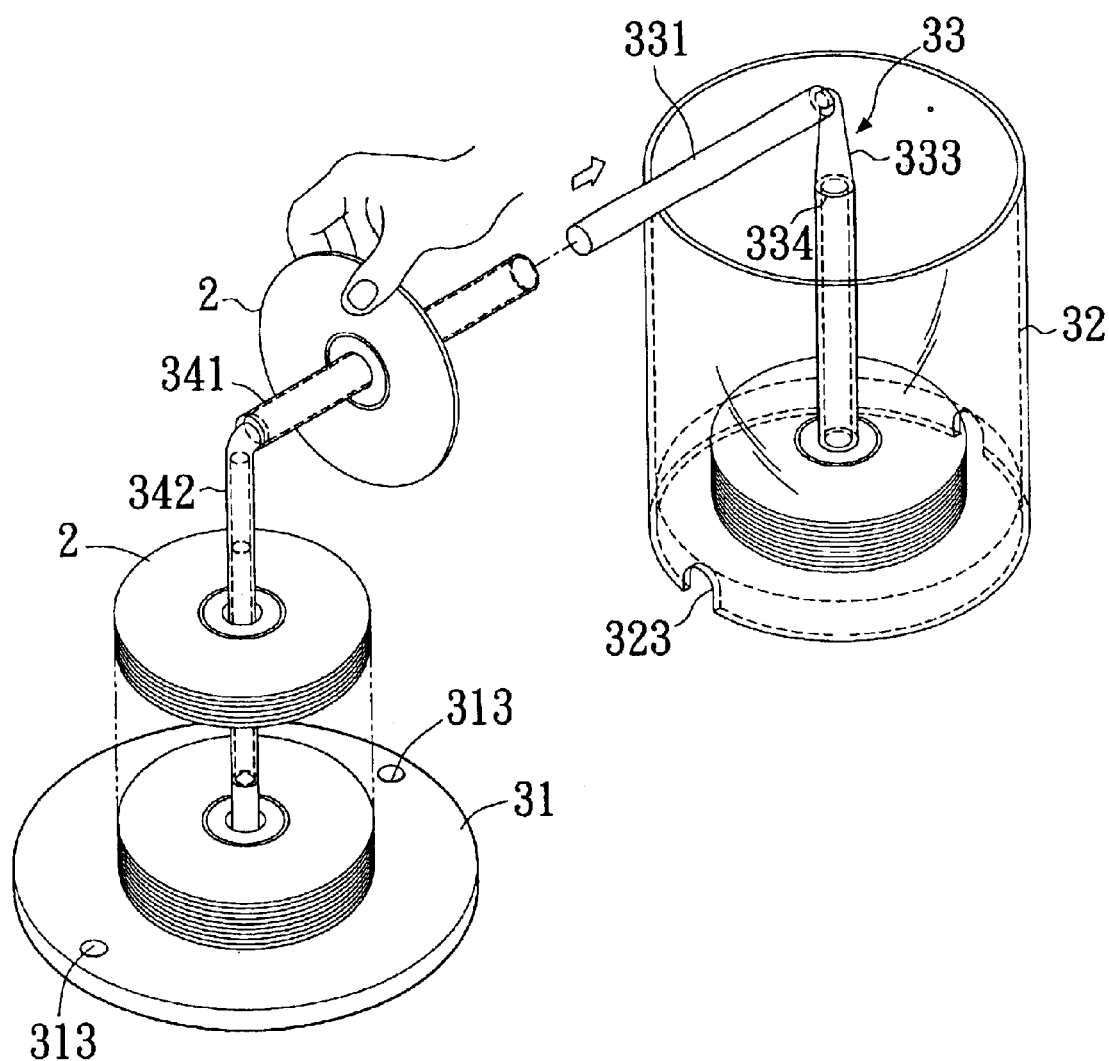
Figure 7:
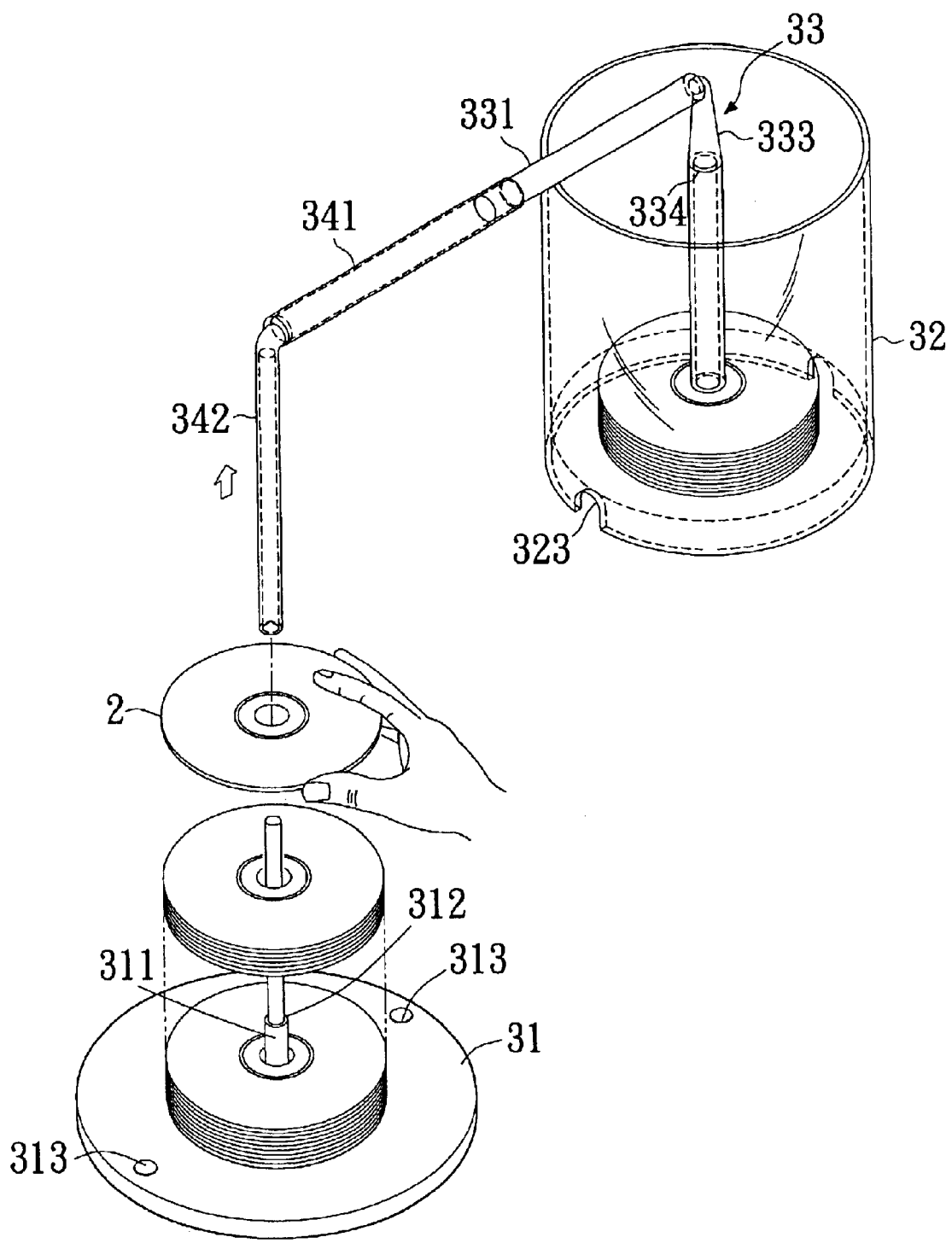

By moving unwanted compact disks from the base 31 to the reversed cylindrical cover 32 in several batches, the target compact disk or disks 2 can be quickly located. Differences in diameter between the vertical and the horizontal tubes 342, 341 and between the horizontal and the vertical bar 331, 332 enable the compact disks 2 to quickly pass angled joints of these tubes and bars, as shown in FIG. 5. The located target compact disk(s) can be conveniently and quickly removed from the CD container 3 by disengaging the horizontal tube 341 from the horizontal bar 331, as shown in FIG. 6, or disengaging the vertical tube 342 from the central bar 311 of the base 31, as shown in FIG. 7.

What is claimed is:

1. A compact disk container, comprising:

a base having a central bar vertically upward extended from a top center thereof;

a cylindrical cover having a diameter slightly smaller than that of said base for correspondingly closing onto the top of said base, said cylindrical cover having a closed top, and a central sleeve vertically downward extended from said closed top into said cylindrical cover, and said central sleeve being adapted to receive said central bar on said base when said cylindrical cover is closed onto said base;

first connecting means including a horizontal bar and a vertical bar angularly connected to each other at one end thereof, said end of said vertical bar connected to said horizontal bar having a diameter slightly smaller than that of said horizontal bar to facilitate quick and smooth movement of a compact disk from said horizontal bar to said vertical bar via said end, and said vertical bar being adapted to insert into said central sleeve of said cylindrical cover; and second connecting means including a horizontal tube and a vertical tube angularly connected to each other at one end thereof, said end of said vertical tube connected to said horizontal tube having a diameter slightly smaller than that of said horizontal tube to facilitate quick and smooth movement of a compact disk from said vertical tube to said horizontal tube via said end, and said vertical tube being adapted to movably receive said central bar of said base therein, and said horizontal tube being adapted to movably receive said horizontal bar of said first connecting means therein.

2. The compact disk container as claimed in claim 1, wherein said base is provided at two diametrically opposite sides with two insertion holes for said vertical bar and said vertical tube of said first and said second connecting means, respectively, to insert there into.

3. The compact disk container as claimed in claim 1, wherein said central bar of said base is a stepped bar having a shoulder portion formed thereon, and said shoulder portion being adapted to abut on a lower end of said vertical tube of said second connecting means when said central bar is received in said vertical tube.

4. The compact disk container as claimed in claim 1, wherein said cylindrical cover includes an axial flange upward extended from an outer peripheral edge of said closed top of said cylindrical cover, and said axial flange being provided at two diametrically opposite sides with two symmetrical notches, in which two outer ends of said horizontal bar of said first connecting means and said horizontal tube of said second connecting means in a connected state are seated for said first and said second connecting means to straddle said closed top of said cylindrical cover.

5. The compact disk container as claimed in claim 1, wherein said end of said vertical bar of said first connecting means connected to said horizontal bar is in the shape of a conic head, a pointed end of said conic head being connected to said horizontal bar, and a shoulder portion being formed between a rear end of said conic head and said vertical bar, such that said shoulder portion abuts on a free end of said central sleeve when said cylindrical cover is reversed and said vertical bar is inserted into said central sleeve.

* * * * *